Patented Nov. 13, 1951

2,574,894

UNITED STATES PATENT OFFICE 2,574,894

BETA-THIOALKYL MERCAPTAN PROMOTER-MODIFIERS FOR CONJUGATED DIOLEFIN POLYMERIZATIONS

Harold R. Snyder, Urbana, Ill., and John M. Stewart, Missoula, Mont., assignors to Phillips Petroleum Company, a corporation of Delaware No Drawing. Application November 17, 1947, Serial No. 786,540

22 Claims. (Cl. 260—84.3)

This invention relates to the polymerization of unsaturated organic compounds capable of undergoing an addition polymerization to form long chain molecules or high polymers of the type known as synthetic rubber. In one of its most specific aspects it relates to the copolymerization of 1,3-butadiene and styrene. This invention also relates to the polymerization of an aliphatic conjugated diene hydrocarbon, including substituted derivatives, either alone or in admixture with other unsaturated monomeric compounds copolymerizable therewith. The invention is particularly useful for the polymerization of a 1,3-butadiene hydrocarbon and a monomer copolymerizable therewith in an aqueous dispersion.

It is well known that an aliphatic conjugated diene hydrocarbon may be polymerized to long chain high polymers or synthetic rubber-like materials having some of the characteristic properties of natural rubber. It is also known that when these conjugated diene hydrocarbons are subjected to polymerization conditions in the presence of any of a number of unsaturated organic compounds copolymers are formed. The polymerization is often carried out in an aqueous emulsion. The present invention is particularly applicable to the polymerization of an aliphatic conjugated diene hydrocarbon in an aqueous emulsion in the presence of an unsaturated organic compound copolymerizable therewith. The conjugated diene hydrocarbons which undergo this type polymerization reaction, i. e. addition of the monomer molecules to form long chain high polymers, are often termed 1,3-butadiene hydrocarbons. Of particular importance in the synthetic rubber field are copolymers of an aliphatic conjugated diene hydrocarbon, particularly 1,3-butadiene, and a suitable comonomer. Butadiene may be polymerized with various known comonomers such as styrene, derivatives of styrene containing an active vinyl ($CH_2=C<$) group, acrylonitrile, methacrylonitrile, methyl acrylate, methyl methacrylate, and the like.

An object of this invention is to provide an improved process for the polymerization of unsaturated organic compounds to form high molecular weight polymers or synthetic rubbers.

Another object is to provide an improved process for the polymerization of a conjugated diene hydrocarbon and a monomer copolymerizable therewith.

Still another object is to provide an improved process for carrying out this type polymerization in an aqueous emulsion.

Still another object is to provide improved promoter-modifier compounds for the polymerization reaction.

Other objects and advantages of the present invention will be apparent to those skilled in the art from the accompanying detailed disclosure.

In the production of synthetic rubber, polymerizable organic compounds are contacted in media and under conditions whereby polymers of rubber-like characteristics are obtained. The properties of the polymers produced, particularly as regards tack, cohesiveness, milling characteristics, and the like, are of primary importance in carrying out such processes. It is also requisite, from an economic viewpoint, that the reaction should proceed as rapidly as is possible without detrimental effects on the properties of the product. Modifiers and promoters, as employed in conventional polymerization procedures, are added in order to effect the desired conversion in a minimum reaction time and to produce polymers having desirable characteristics. The properties of the product are influenced by the action of modifiers which operate to eliminate or substantially reduce cross linkage between the polymer units, with consequent formation of gel-type products, and also serve to regulate the average molecular weight of the polymer, a factor which influences to a large extent the properties of the product. The rate of polymerization is governed by various factors but under fixed operating conditions is largely dependent upon the action of substances known as promoters.

In many instances, and particularly in the standard emulsion polymerization procedures employing a recipe of the type:

| | | |
|---|---|---|
| Butadiene | parts | 75 |
| Styrene | do | 25 |
| Potassium persulfate | do | 0.3 |
| Soap | do | 5 |
| Water | do | 180 |
| Modifier | | variable | promoting and modifying effects are obtained concurrently by the employment of promoter-modifiers, usually comprising a primary or tertiary aliphatic mercaptan or blend of such mercaptans in the $C_8$ to $C_{16}$ range. Mercaptans of carbon content less than $C_8$ either enhance the polymerization rate very little, or actually inhibit or reduce this polymerization rate. Thus promoting and modifying in such reactions has heretofore been dependent upon the action of a relatively small number of compounds in which the only variables lie in the length and configuration of the hydrocarbon chain.

We have now found new promoter-modifiers for polymerization processes whereby additional variables in both promoting and modifying action are provided by the substitution of a second functional group near the active sulfhydryl group in an aliphatic or alicyclic mercaptan. Also, through the discoveries of this invention, it is possible to treat mercaptans of carbon content $C_7$ or less, normally valueless as promoters, so that they become exceedingly valuable for this purpose. The promoter-modifiers of our invention comprise mercaptans, preferably containing not more than six carbon atoms in the mercaptan nucleus, in which the substituent group is a thioether (—S—R) group, containing from three to sixteen carbon atoms, located in the beta position. These compounds may contain either primary, secondary, or tertiary mercapto groups and can be employed either alone or in compositions or blends as desired.

An important advantage of the present invention lies in the adaptability of our novel promoter-modifiers to varying conditions and requirements in polymerization processes. It is particularly noteworthy that generally much smaller quantities of these olefin sulfide-mercaptan addition products are required to effect a promoting and modifying action superior or at least comparable to that of the frequently used primary dodecyl mercaptan. For example, the addition products of n-heptyl mercaptan and 2-ethylhexyl mercaptan with isobutylene sulfide are particularly advantageous. In other cases where either the promoting or the modifying effects obtained with our novel agents are superior to results normally produced and it is desired to enhance the other property, mixtures or blends of our materials may be employed. Mixtures of addition products of one, two, and three mols of olefin sulfides with one mol of mercaptan are also known to produce desirable promoting and modifying effects in polymerization recipes. In particular, the crude mixture of addition products from the reaction of one mol of n-butyl mercaptan with three mols of isobutylene sulfide is known to give good results. Commercial production of such mixtures is a relatively simple and inexpensive process.

The beta-substituted mercaptans employed in this invention are reaction products of olefin sulfides and mercaptans and are prepared by the interaction of olefin sulfides with aliphatic mercaptans according to the method disclosed in our copending application, Serial No. 747,122, filed May 9, 1947, of which this application is a continuation-in-part. This is now Patent 2,490,984, granted December 13, 1949. While primary mercaptans are generally preferred, secondary and tertiary mercaptans are also included in the scope of the disclosure. In the preparation of these novel promoter-modifiers we have preferred to employ olefin sulfides containing not more than six carbon atoms to the molecule, such as ethylene sulfide, propylene sulfide, isobutylene sulfide, cyclohexene sulfide, and the like, although the use of sulfides containing a larger number of carbon atoms to the molecule is not beyond the scope of this disclosure. These olefin sulfides are reacted with aliphatic mercaptans, particularly those of primary configuration, in the $C_3$ to $C_{16}$ range. As disclosed in our application Serial No. 747,122, a mixture of beta-substituted mercaptans, in which a thioether group is the beta substituent, or beta mercapto thioethers, is usually produced. Thus, when normal hexyl mercaptan is reacted with isobutylene sulfide, the reaction proceeds according to the following equations to produce a mixture of isomeric, primary and tertiary beta-substituted mercaptans:

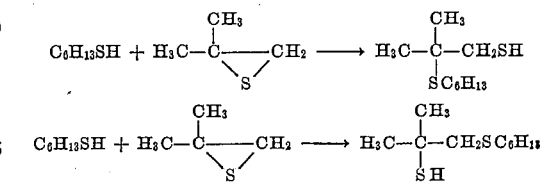

The promoter-modifiers of our invention may be employed in various types of polymerization processes although we have preferred to operate with those systems in which polymerization is carried out in aqueous emulsions, typified by the conventional GR-S procedure. Our beta-substituted mercaptans, in which a thioether group is the beta substituent, may be added to the reaction mixture by any conventional method, such as by incorporation of the entire amount required in the original reaction mixture, or by a small initial addition followed by increments supplied during the course of the reaction.

*Example 1*

Polymerization mixtures were prepared according to the following recipe:

Parts by weight

Butadiene _____75
Styrene _____25
Potassium persulfate _____0.3
Promoter-modifier _____variable
Soap _____5.0
Water _____180

A series of four tests was run. In the first reactor a control test was made employing 0.5 part primary dodecyl mercaptan (the amount normally used in GR-S formulations) as the promoter-modifier while in the second, third, and fourth runs the addition product of n-heptyl mercaptan with isobutylene sulfide (comprising a mixture of beta (thio-n-heptyl) methylpropylmercaptans) was used, the amounts being 0.27, 0.38, and 0.55 part, respectively. The largest quantity of the addition compound employed is equivalent (in mols) to 0.5 part of dodecyl mercaptan. The reactor contents were agitated for 12 hours at a temperature of 50° C. after which phenyl-beta-naphthylamine was added and the latex was coagulated with brine-acid solution, washed, and dried. The per cent conversion, benzene solubility, and intrinsic viscosity were determined on each sample. The polymers were gel free as evidenced by their solubility in benzene. The table which follows shows the results obtained:

| Run No. | Promoter-Modifier Concentration, Parts | Conversion, Per Cent | Intrinsic Viscosity |
|---|---|---|---|
| 1 (control) | 0.5 | 77.0 | 2.40 |
| 2 | 0.27 | 82.5 | 1.95 |
| 3 | 0.38 | 83.0 | 2.17 |
| 4 | 0.55 | 74.5 | 2.06 |

Example II

The addition product of 2-ethylhexyl mercaptan and isobutylene sulfide (comprising a mixture of beta (thio-2-ethylhexyl) methylpropylmercaptans) was employed in the polymerization recipe using the procedure of Example I. A control using 0.5 part primary dodecyl mercaptan and three other runs using varying amounts of the olefin sulfide-mercaptan addition product were made. The following table shows the amounts of promoter-modifiers employed and the results obtained:

| Run No. | Promoter-Modifier Concentration, Parts | Conversion, Per Cent | Intrinsic Viscosity |
|---|---|---|---|
| 1 (control) | 0.5 | 77.0 | 1.90 |
| 2 | 0.29 | 74.5 | 2.56 |
| 3 | 0.41 | 75.0 | 2.34 |
| 4 | 0.58 | 76.0 | 1.90 |

The largest amount of addition product used (0.58 part) is equivalent to 0.5 part of the primary dodecyl mercaptan. Solubility of the polymers in benzene was substantially complete.

Example III

Polymerization was carried out with the recipe of Example I in which the addition product of n-amyl mercaptan with cyclohexene sulfide (comprising beta (thio-n-amyl) cyclohexylmercaptan) was employed as the promoter-modifier. The procedure of Example I was followed. At the conclusion of a 12-hour reaction period a monomer conversion of 65.5 per cent was realized. The polymer was substantially gel free and had an intrinsic viscosity of 2.44. A parallel run was made using an equivalent amount (0.5 part) of primary dodecyl mercaptan as the promoter-modifier. A 70 per cent conversion was realized and the intrinsic viscosity of the benzene soluble polymer was 1.49.

Example IV

The procedure of Example I was employed for carrying out polymerization using the recipe of Example I in which the addition product of n-hexyl mercaptan and cyclohexene sulfide (comprising beta (thio-n-hexyl) cyclohexylmercaptan) was used as the promoter-modifier. An amount of the addition product equivalent to 0.5 part primary dodecyl mercaptan was used in the first run and a smaller quantity was added in the second run. A control test was performed using 0.5 part primary dodecyl mercaptan as in each of the preceding examples. The following results were obtained:

| Run No. | Promoter-Modifier Concentration, Parts | Conversion, Per Cent | Intrinsic Viscosity |
|---|---|---|---|
| 1 | 0.58 | 70.5 | 2.34 |
| 2 | 0.40 | 74.5 | 1.96 |
| 3 (control) | 0.5 | 79.5 | 2.26 |

The polymer samples were substantially gel free as evidenced by benzene solubility tests.

Example V

A promoter-modifier composition comprising a crude mixture of addition products obtained from the reaction of one mol of n-butyl mercaptan and three mols of isobutylene sulfide was employed in a polymerization recipe in an amount equivalent (in mols) to 0.5 part primary dodecyl mercaptan. The quantity used was 0.88 part. The promoter-modifier was assumed to be a tri-addition product of the mercaptan with the olefin sulfide. The reaction was effected according to the recipe and the procedure of Example I and gave a 77 per cent conversion in twelve hours. The gel-free polymer had an intrinsic viscosity of 1.73. The usual control run was made and a conversion of 78.5 per cent was obtained. The intrinsic viscosity of the product was 1.79.

The use of a beta-substituted mercaptan as a promoter-modifier in accordance with this invention may be applied to the polymerization of conjugated diene hydrocarbons. It is particularly useful for the copolymerization of a conjugated diene hydrocarbon and at least one other unsaturated compound copolymerizable with the diene. Suitable diene hydrocarbons include 1,3-butadiene, isoprene, 2,3-dimethyl butadiene, piperylene, and the like. Compounds copolymerizable with conjugated diene hydrocarbons contain an active vinyl ($CH_2=C<$) group and comprise aryl olefins (e. g. styrene, p-chloro styrene, p-methoxy styrene, vinyl naphthalene, etc.); vinyl furan, vinyl pyridine, vinyl thiophene, vinyl quinoline, and the like; alkyl esters of acrylic acid (e. g. methyl acrylate, ethyl acrylate, butyl acrylate, etc.); esters of substituted acrylates (e. g., methyl methacrylate, ethyl methacrylate, butyl methacrylate, methyl ethacrylate, etc.); nitriles of acrylic acids (e. g. acrylonitrile, methacrylonitrile, etc.); vinylidine chloride; vinyl ketones (e. g. methyl vinyl ketone); vinyl ethers (e. g. methyl vinyl ether); vinyl carbazole; and other unsaturated compounds. The present invention is especially useful for the copolymerization of a conjugated diolefin containing from four to six carbon atoms and a comonomer, such as styrene, acrylonitrile, methyl acrylate, and methyl methacrylate. Those conjugated diolefins which are especially useful are 1,3-butadiene, isoprene, and equivalents, for example, chloroprene.

We claim:

1. The method which comprises polymerizing an aliphatic conjugated diene hydrocarbon while in an aqueous dispersion in the presence of a minor proportion of a beta-substituted mercaptan in which an alkyl thioether group occupies the beta position.

2. The method which comprises polymerizing a 1,3-butadiene hydrocarbon while in an aqueous dispersion in the presence of a minor proportion of a beta-substituted mercaptan containing not more than six carbon atoms in the mercaptan nucleus and in which an alkyl thioether group containing from three to sixteen carbon atoms is the substituent group.

3. In the polymerization of an unsaturated organic compound containing a $CH_2=C<$ group and which while in an aqueous dispersion undergoes an addition polymerization to form a high molecular weight linear polymer, the improvement which comprises carrying out the polymerization of said compound while in an aqueous dispersion in the presence of a minor proportion of a promoter-modifier comprising a beta mercapto thio ether resulting from reaction of an olefin sulfide containing not more than six carbon atoms per molecule and an aliphatic mercaptan containing from three to sixteen carbon atoms per mol.

4. In the manufacture of synthetic rubber-like materials by the copolymerization of a 1,3-butadiene and a monomer copolymerizable therewith in an aqueous emulsion, the improvement which comprises carrying out the polymerization in an aqueous emulsion in the presence of a minor proportion of a beta-substituted mercaptan containing not more than six carbon atoms in the mercaptan nucleus and in which a thioether group containing not more than sixteen carbon atoms is the substituent group, said beta-substituted mercaptan being a reaction product of an olefin sulfide and an aliphatic mercaptan.

5. In the production of synthetic rubber by polymerization in an aqueous emulsion of a mixture of a major amount of 1,3-butadiene and a minor amount of styrene in the presence of a catalyst, the improvement which comprises conducting said polymerization in the presence of a promoter-modifier which comprises a mercaptan of the class consisting of beta thioalkyl-substituted alkyl and cycloalkyl mercaptans having two to six carbon atoms in the mercaptan nucleus and having three to sixteen carbon atoms in said thioalkyl group.

6. The process of claim 1 in which said beta-substituted mercaptan comprises a beta thioalkyl cyclohexyl mercaptan in which said thioalkyl group contains three to sixteen carbon atoms.

7. The process of claim 1 in which said beta-substituted mercaptan comprises a mixture of addition products obtained from the reaction of one mol of n-butyl mercaptan and three mols of isobutylene sulfide.

8. The process of claim 1 in which said beta-substituted mercaptan comprises a beta thioether-substituted methylpropylmercaptan having three to sixteen carbon atoms in said thioether group.

9. In polymerizing in an aqueous emulsion an unsaturated organic compound containing a $CH_2=C<$ group and which undergoes an addition polymerization to form a linear polymer of high molecular weight, the improvement which comprises conducting said polymerization in the presence of a promoter-modifier which comprises a mercaptan of the class consisting of beta thioalkyl-substituted alkyl and cycloalkyl mercaptans having two to six carbon atoms in the mercaptan nucleus and having three to sixteen carbon atoms in said thioalkyl group.

10. In the production of synthetic rubber by polymerization in an aqueous emulsion of a mixture of a major amount of 1,3-butadiene in the presence of an emulsion polymerization catalyst and an emulsifier, the improvement which comprises conducting said polymerization in the presence of a promoter-modifier which comprises a beta thioalkyl-substituted alkyl mercaptan having two to six carbon atoms in said mercaptan nucleus and three to sixteen carbon atoms in said thioalkyl group.

11. In the production of synthetic rubber by polymerization in an aqueous emulsion of a mixture of a major amount of 1,3-butadiene and a minor amount of styrene in the presence of an emulsion polymerization catalyst and an emulsifier, the improvement which comprises conducting said polymerization in the presence of a promoter-modifier which comprises a beta thioalkyl-substituted cyclohexyl mercaptan having three to sixteen carbon atoms in said thioalkyl group.

12. In the production of synthetic rubber by polymerization in an aqueous emulsion of a mixture of a major amount of 1,3-butadiene and a minor amount of styrene in the presence of an emulsion polymerization catalyst and an emulsifier, the improvement which comprises conducting said polymerization in the presence of a promoter-modifier which comprises beta-substituted mercaptans contained in a mixture of addition products obtained from the reaction of one mol of n-butyl mercaptan and three mols of isobutylene sulfide.

13. The process of claim 10 in which said mercaptan comprises a beta(thio-n-heptyl) methylpropylmercaptan.

14. The process of claim 11 in which said mercaptan comprises beta(thio-n-hexyl) cyclohexylmercaptan.

15. A process for the production of synthetic rubber, which comprises polymerizing a conjugated diene while in an aqueous dispersion and in the presence of a promoter-modifier which comprises a mercaptan of the class consisting of beta thioalkyl-substituted alkyl and cycloalkyl mercaptans having two to six carbon atoms in the mercaptan nucleus and having three to sixteen carbon atoms in said thioalkyl group.

16. The process of claim 15 in which said beta-substituted mercaptan comprises a beta thioalkyl cyclohexyl mercaptan in which said thioalkyl group contains three to sixteen carbon atoms.

17. The process of claim 15 in which said beta-substituted mercaptan comprises a mixture of addition products obtained from the reaction of one mol of n-butyl mercaptan and three mols of isobutylene sulfide.

18. The process of claim 15 in which said beta-substituted mercaptan comprises a beta thioalkyl-substituted methylpropylmercaptan having three to sixteen carbon atoms in said thioalkyl group.

19. The process of claim 15 in which said mercaptan comprises a beta(thio-n-heptyl) methylpropylmercaptan.

20. The process of claim 15 in which said mercaptan comprises beta(thio-n-hexyl) cyclohexylmercaptan.

21. The process of claim 15 in which said beta-substituted mercaptan comprises a beta(thio-alpha-ethylhexyl) methylpropylmercaptan.

22. The process of claim 15 in which said beta-substituted mercaptan comprises a beta(thio-n-amyl) cyclohexylmercaptan.

HAROLD R. SNYDER.
JOHN M. STEWART.

REFERENCES CITED

The following references are of record in the file of this patent:

UNITED STATES PATENTS

| Number | Name | Date |
| --- | --- | --- |
| 2,460,567 | Browning | Feb. 1, 1949 |

OTHER REFERENCES

Kolthoff et al., J. Polymer Sci., 2, 49–71, Feb. (1947).